(12) United States Patent
Lohtia et al.

(10) Patent No.: US 7,280,510 B2
(45) Date of Patent: Oct. 9, 2007

(54) CONTROLLING REVERSE CHANNEL ACTIVITY IN A WIRELESS COMMUNICATIONS SYSTEM

(75) Inventors: Anit Lohtia, Plano, TX (US); Yuqiang Tang, Plano, TX (US); Miroslav Budic, Murphy, TX (US)

(73) Assignee: Nortel Networks Limited, St. Laurent, Quebec (CA)

( * ) Notice: Subject to any disclaimer, the term of this patent is extended or adjusted under 35 U.S.C. 154(b) by 967 days.

(21) Appl. No.: 10/152,079

(22) Filed: May 21, 2002

(65) Prior Publication Data

US 2003/0218997 A1 Nov. 27, 2003

(51) Int. Cl.
*H04B 7/216* (2006.01)

(52) U.S. Cl. .................... 370/335; 455/67.11

(58) Field of Classification Search ........... 370/468, 370/335, 236, 276, 342, 319, 320, 321, 324, 370/326; 455/67.11, 450, 63, 408
See application file for complete search history.

(56) References Cited

U.S. PATENT DOCUMENTS 5,857,147 A * 1/1999 Gardner et al. .......... 455/67.11
5,914,950 A * 6/1999 Tiedemann et al. ......... 370/348

OTHER PUBLICATIONS

3rd Generation Partnership Project 2, 3GPP2 C.S0024 V2.0, pp. 1-2-1-15, 6-26-6-29, 6-51-6-59, 8-31-8-49, 9-22, 9-26-9-28, 9-34-9-35, 9-48, 9-56-9-61, 9-66, (Oct. 27, 2000).

* cited by examiner

*Primary Examiner*—Chi Pham
*Assistant Examiner*—Alexander O. Boakye
(74) *Attorney, Agent, or Firm*—Trop, Pruner & Hu, P.C.

(57) ABSTRACT

A wireless communications system includes access networks and access terminals. Within each cell or cell sector, reverse links and forward links are defined between an access network and multiple access terminals in the cell or cell sector. Based on a reverse data rate threshold value calculated from noise measurements, the access network indicates to access terminals within its cell or cell sector whether activity on reverse links are to be increased or decreased.

27 Claims, 3 Drawing Sheets

CONTROLLING REVERSE CHANNEL ACTIVITY IN A WIRELESS COMMUNICATIONS SYSTEM

TECHNICAL FIELD

This invention relates generally to controlling activity in a reverse channel of a packet data wireless link.

BACKGROUND

Mobile communications systems are made up of a plurality of cells. Each cell provides a radio communications center through which a mobile station establishes a call or other communications session with another mobile station or a terminal connected to either a circuit-switched network (e.g., public-switched telephone network or PSTN) or a packet-switched data network. Each cell includes a radio base station, with each base station coupled to a switching center that controls processing of calls or other communications sessions between or among mobile stations or between mobile stations and terminals connected to a circuit-switched or a packet-switched network.

Various wireless protocols exist for defining communications in a wireless network. One type of protocol is based on the time-division multiple access (TDMA) technology, such as the TIA/EIA-136 standard provided by the Telecommunications Industry Association (TIA) or the Global System for Mobile (GSM) standard. Another type of protocol for wireless communications is based on the code-division multiple access (CDMA) technology. CDMA is a spread spectrum wireless communications protocol in which transmission is based on the spread spectrum modulation technique to allow many users to have access to the same band of carriers.

Traditionally, wireless networks have been designed for carrying circuit-switched voice traffic. However, with the wide availability of the Internet and intranets, packet-switched communications (e.g., web browsing, electronic mail, instant messaging, electronic gaming, and so forth) have become common. As a result, third generation (3G) and beyond wireless technologies are being developed to provide higher bandwidth and more efficient packet-switched communications (of data as well as voice and other forms of real-time data) over wireless networks.

In the CDMA context, a CDMA 2000 family of standards has been developed that is capable of supporting both traditional circuit-switched traffic as well as packet-switched traffic. On the TDMA side, packet-switched wireless communications protocols have also been developed.

The first phase of CDMA 2000 is referred to as 1×RTT (also referred to as 3G1× or 1×), which is designed to increase voice capacity as well as to support data transmission speeds that are faster than typically available. In addition, for even higher data rates, a High Rate Packet Data (HRPD) wireless technology has been developed. HRPD is defined as TIA/EIA/IS-856, "CDMA 2000, High Rate Packet Data Air Interface Specification," which is adopted by the TIA. The HRPD technology is also referred to as the 1×EV-DO or 1×EV technology. 1×EV-DO provides relatively high data transfer rates over the air interface between mobile stations and base stations.

In a 1×EV-DO network, the mobile station, rather than the base station, controls the rate of data communicated in the reverse link (which is the link from the mobile station to the base station). Thus, multiple mobile stations in the wireless network can potentially set different data rates over the reverse link. If the data rates in the reverse link are not controlled properly, the reverse link may either be underutilized (if the data rates are set to low) or excessive interference may result (if the data rates are set too high).

SUMMARY

In general, a mechanism is provided to efficiently control data rates in a reverse link of a packet data wireless link. For example, a method of controlling data rates in a wireless communications system includes determining a condition of forward links between mobile stations and wireless access equipment, and computing a capacity of reverse links between the mobile stations and the wireless access equipment based on the condition of the forward links. The method further includes indicating, based on the computed capacity, to at least one of the mobile stations whether a data rate on the reverse link between the at least one mobile station and the wireless access equipment is to be increased or decreased.

Other or alternative features will become apparent from the following description, from the drawings, and from the claims.

DETAILED DESCRIPTION

In the following description, numerous details are set forth to provide an understanding of the present invention. However, it will be understood by those skilled in the art that the present invention may be practiced without these details and that numerous variations or modifications from the described embodiments may be possible.

Figure 1:
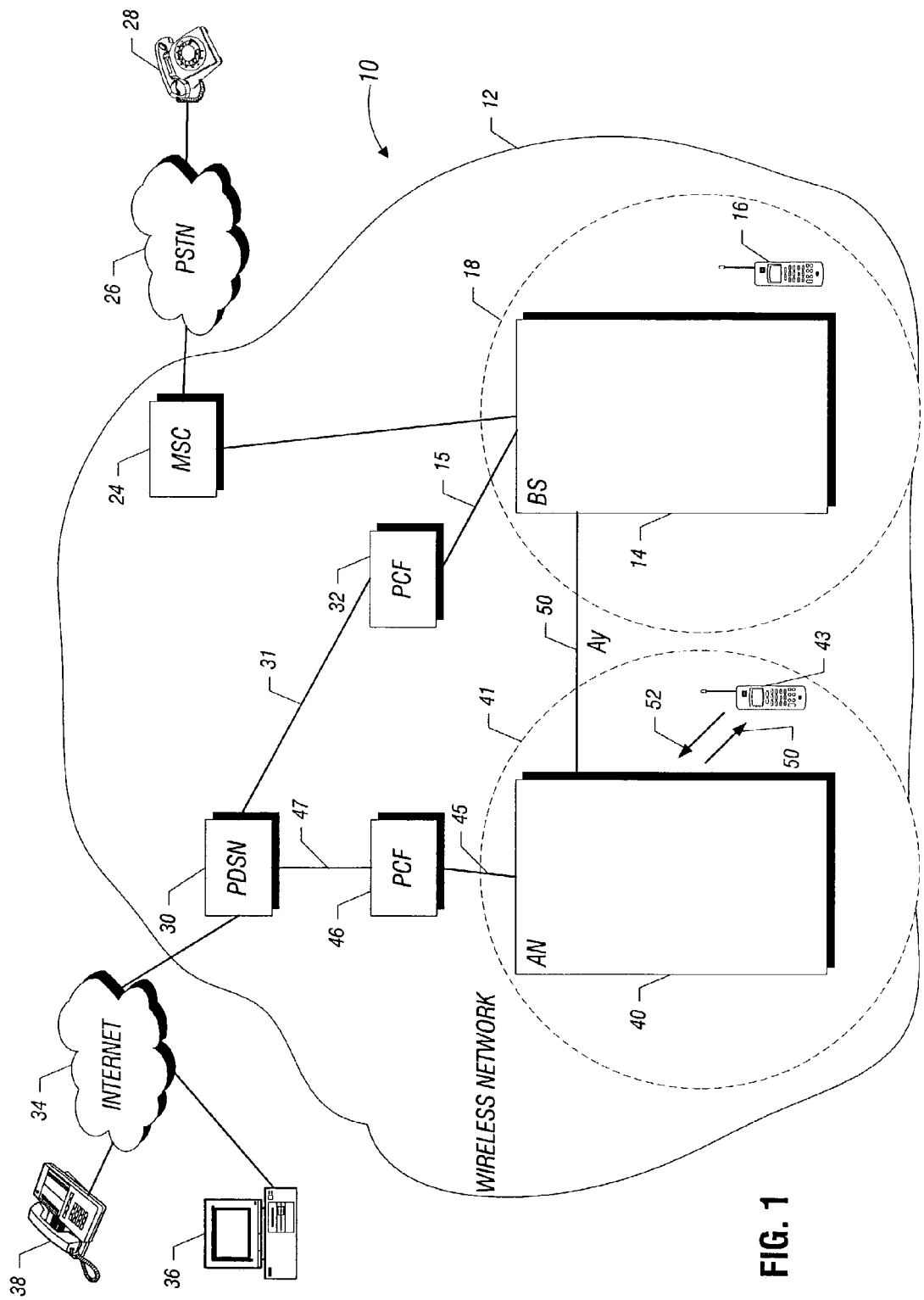
FIG. 1 is a block diagram of an example arrangement of a communications network that includes a packet data wireless network.

Referring to FIG. 1, a wireless communications network 10 has a coverage area designated generally as 12. In one embodiment, the wireless communications network 10 includes components that operate according to the CDMA (code-division multiple access) 2000 protocol. CDMA 2000 is defined by the CDMA 2000 family of standards (collectively referred to as the IS-2000 Standard, which is developed by the Third Generation Partnership Project 2 (3GPP2)). In other embodiments, other types of wireless protocols, such as TDMA (time-division multiple access) protocols, can be used for communications in the wireless communications network 10.

For circuit-switched communications, the wireless communications network 10 includes a base station (BS) 14, which is an entity used for radio telecommunications with mobile stations (e.g., mobile station 16) within a cell or cell sector 18 covered by the base station 14. For communicating circuit-switched voice traffic, the base station 14 is coupled to a mobile switching center (MSC) 24, which is responsible for switching mobile station-originated or mobile station-terminated traffic. Effectively, the MSC 24 is the interface for signaling and user traffic between the wireless network 10 and other public-switched networks (such as a public-switched telephone network (PSTN) 26 or other MSCs). The PSTN 26 is connected to landline terminals, such as telephone 28.

In addition to circuit-switched services, the base station 14 can also support packet data communications, in which packet data is communicated between a mobile station and another endpoint, which can be a terminal coupled to a data network 34 or another mobile station that is capable of communicating packet data. Examples of the data network 34 include private networks (such as local area networks or wide area networks) and public networks (such as the Internet). In one example, the base station 14 is part of a 1×RTT system, which supports packet data services through the use of a packet control function (PCF) module 32 and a packet data serving node (PDSN) 30. The base station 14 and PCF module 32 are optional components that may be omitted in some embodiments.

Packet data services involve packet-switched communications. In some embodiments, packet-switched communications are defined by the Internet Protocol (IP). In packet-switched communications, packets or other units of data carry payload (including user data) as well as routing information (in the form of addresses) used for routing the packets or data units over one or more paths of the network to a destination endpoint. One version of IP, referred to as IPv4, is described in Request for Comments (RFC) 791, entitled "Internet Protocol," dated September 1981; and another version of IP, referred to as IPv6, is described in RFC 2460, entitled "Internet Protocol, Version 6 (IPv6) Specification," dated December 1998.

In addition to, or in place of, units that are part of a 1×RTT system, the wireless communications network 10 also includes a 1×EV-DO or 1×EV system that supports packet data services. One version 1×EV-DO is defined in the TIA/EIA/IS-856 standard, entitled "CDMA 2000 High Rate Packet Data Air Interface Specification." The 1×EV-DO (or HRPD) wireless communications system includes an access network (AN) 40, which includes network equipment (such as a base station and other controllers) that provides data connectivity between a packet-switched data network (such as the data network 34) and a mobile station 43 (also referred to as an "access terminal"). The access network 40 provides coverage in a cell or cell sector 41. More generally, reference is made to a "cell segment," which refers to either a cell or cell sector. Also, "mobile station" generally refers to either a mobile station or an access network. Although one implementation is described in the context a 1×EV-DO system, other types of wireless systems can be used in other implementations.

Other embodiments of the invention can be applied to other packet-based wireless protocols, such as the 1×EV-DV protocol (another CDMA2000-based protocol that integrates both voice and data), UMTS (Universal Mobile Telecommunication System) protocol (based on the wideband CDMA protocol), and MCDV (multi-carrier data-voice) protocol (from Nortel Networks).

The access network 40 is coupled to the PDSN 30 to enable packet-switched communications with the packet-switched data network 34. A packet control function (PCF) module 46 is connected between the access network 40 and the PDSN 30. During a communications session, packet data is routed between the access terminal 43 and another endpoint through the access network 40, PCF module 46, and PDSN 30.

As further shown in FIG. 1, the wireless link between the access terminal 43 and the access network 40 includes a forward link 50 (from the access network to the access terminal) and a reverse link 52 (from the access terminal to the access network). Generally, the forward link 50 refers to a wireless link to communicate data and signaling from a mobile station to wireless access equipment in a cell or cell sector, and the reverse link 52 refers to a wireless link to communicate data and signaling from the wireless access equipment to the mobile station. "Wireless access equipment" refers to any one of an "access network," "base station," or other network equipment capable of wirelessly communicating with mobile stations.

In a 1×EV-DO system, the access network 40 does not directly control data rates in the reverse link. Instead, each access terminal selects its data rate in the reverse link. "Data rate" in a wireless link refers to the rate of transfer, usually expressed in bits-per-second, of data (such as user traffic) over the link. The data rate determined by the access terminal is based on several factors, including a reverse activity bit (RAB) and other factors, as defined by the 1×EV-DO standard.

Figure 2:
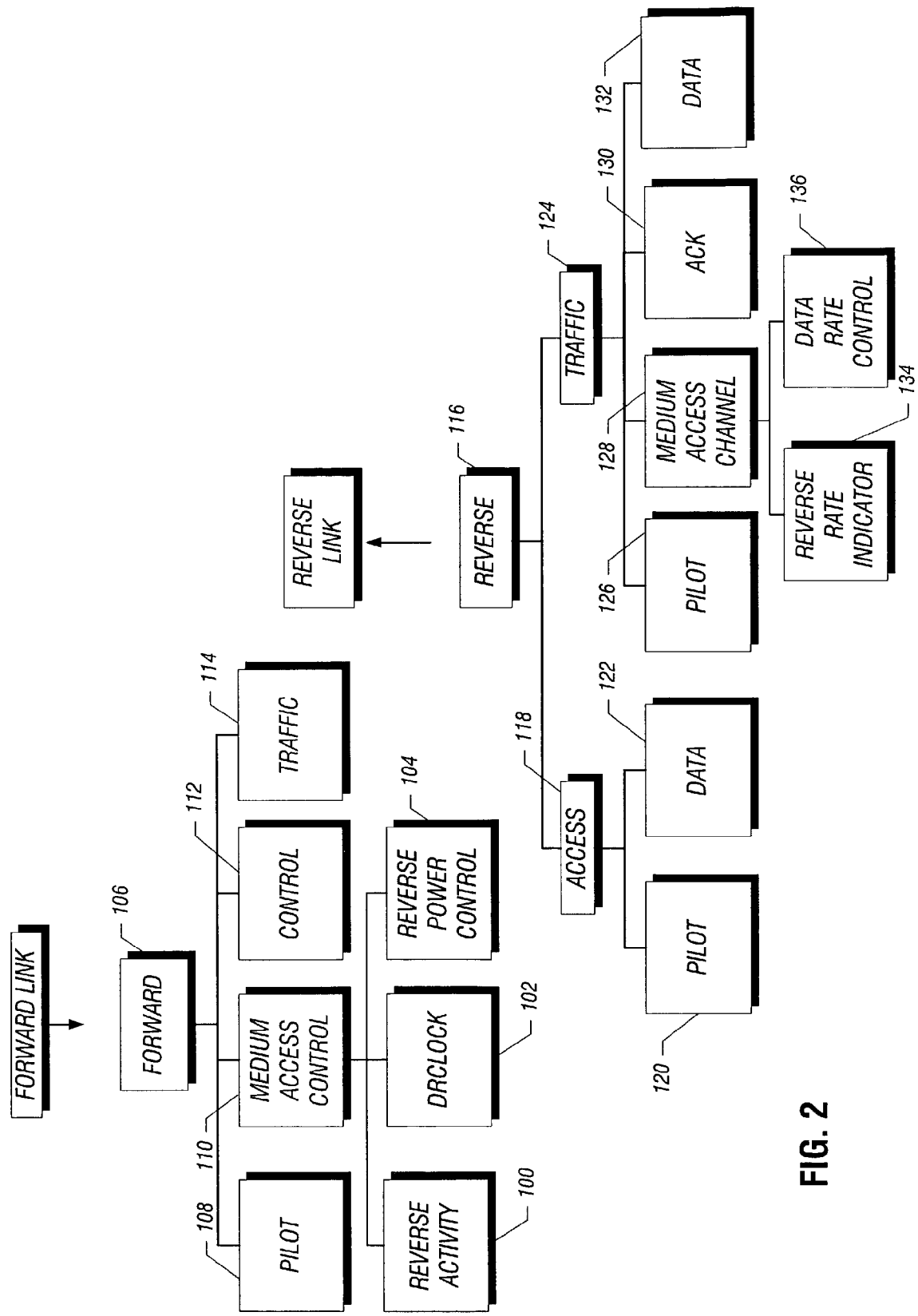
FIG. 2 shows the forward link and-reverse link physical channel structures of the packet data wireless network of FIG. 1.

As shown in FIG. 2, RAB is communicated by the access network to each access terminal within the corresponding cell or cell sector in a forward channel 106 of the forward link. Generally, the RAB is an indicator communicated by wireless access equipment to a mobile station to indicate whether activity in the reverse link should be increased or decreased. The RAB is carried in a reverse activity channel 100, which is part of medium access control (MAC) channel 110 of the forward channel 106. The forward MAC channel 110 also carries a DRCLock bit 102 and a reverse power control channel 104 (for controlling the power of the reverse channel for a given access terminal).

The forward channel 106 also includes a forward pilot channel 108 (which carries the pilot), a forward control channel 112 (which carries control signaling and other data to be received by all access terminals monitoring the forward channel 106), and a forward traffic channel 114 (which carries information to a specific access terminal).

In the reverse link, a reverse channel 116 includes a reverse access channel 118 (which is used by access terminals to communicate with the access network when the access terminals do not have a traffic channel assigned) and a reverse traffic channel 124 (which is the portion of the reverse channel 116 that carries information from a specific access terminal to the access network).

The reverse access channel also 118 includes a reverse access pilot channel 120 (which is the portion of the access channel 118 that carries a pilot) and a reverse access data channel 122 (which is the portion of the access channel 118 that carries data). The reverse traffic channel 124 includes a reverse traffic pilot channel 126 (which carries the pilot in the reverse traffic channel 124), a reverse MAC channel 128 (which is the portion of the reverse traffic channel 124 dedicated to MAC activities), a reverse traffic Ack channel 130 (which indicates the success or failure of forward traffic channel reception), and a reverse traffic data channel 132 (which is the portion of the reverse traffic channel 124 that carries user data).

The reverse traffic MAC channel 128 contains a reverse rate indicator (RRI) channel 134 and a data rate control (DRC) channel 136. The RRI channel 134 is set by an access terminal to indicate (to the access network) the data rate of the reverse traffic data channel 132. The DRC channel 136 is used by the access terminal to indicate to the access network the requested forward traffic channel data rate and the selected serving cell sector on the forward channel 106.

As discussed below, the RRI information and DRC information are used by the access network 40 to control the data rate of the reverse link.

In accordance with some embodiments of the invention, the state of RAB, which is communicated in the forward MAC reverse activity channel 100, is set by the access network 40 based on an estimated capacity of the reverse link 52. The estimated capacity of the reverse link 52 is calculated from data rates of the forward traffic channels 124, as indicated by the DRC channels 136, between access terminals in the cell sector and the access network.

The state of RAB controls whether data rate of the reverse link is to be increased or decreased. If RAB is at a first state, then each access terminal in the cell sector increases its data rate on the reverse link under certain conditions. On the other hand, if RAB is at a second state, then each access terminal in the cell sector decreases its data rate on the reverse link under certain conditions.

Figure 3:
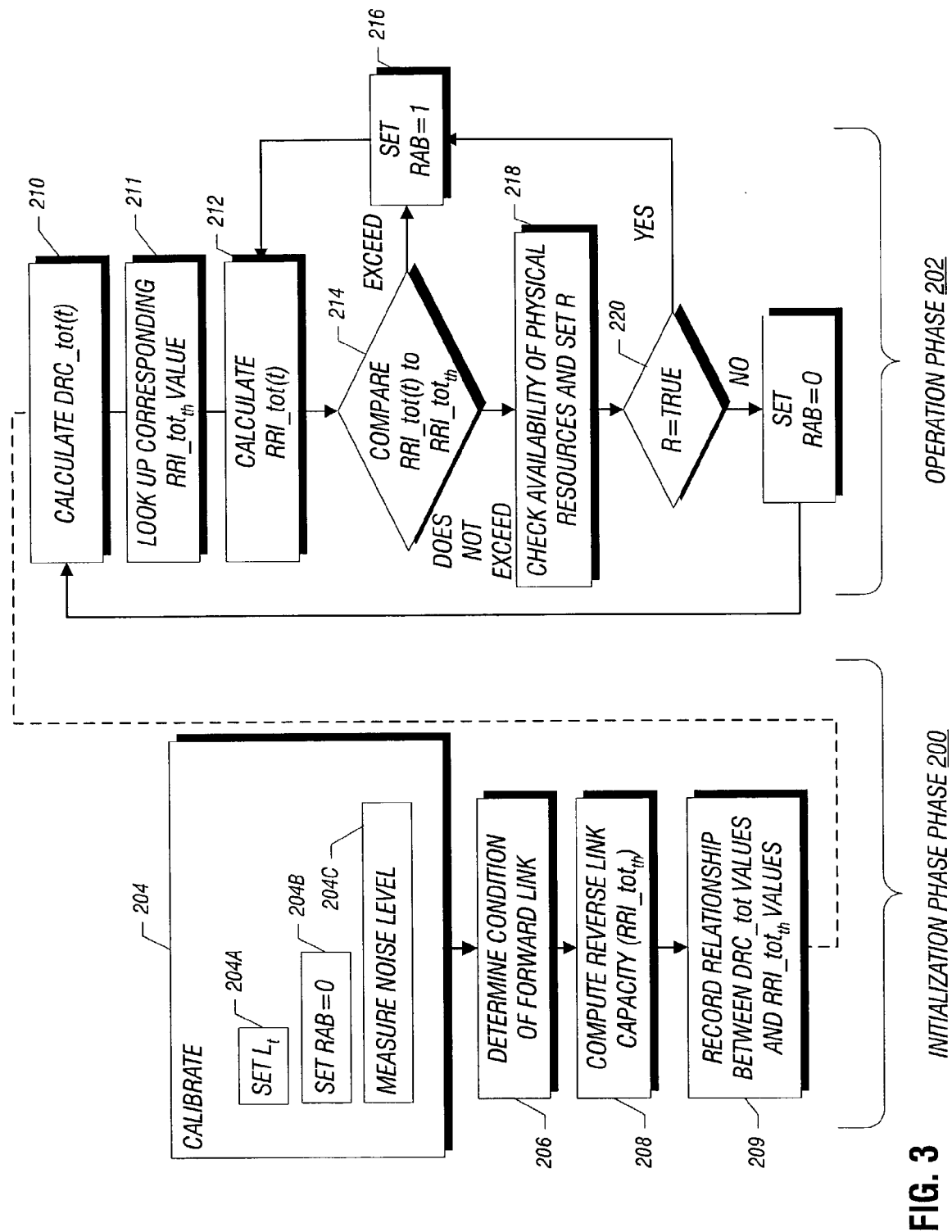
FIG. 3 is a flow diagram of a process of controlling data rates of reverse links in the packet data wireless network of FIG. 1.

FIG. 3 shows a flow for determining the state of RAB, according to one embodiment. The flow has two phases: an initialization (or calibration) phase 200 and an operation phase 202. Generally, the initialization phase 200 is computation intensive and requires some amount of time for the access network to perform. Therefore, the initialization phase is not performed continuously, but rather, is performed either periodically or in response to defined events. On the other hand, the operation phase 202 of the flow is performed substantially continuously to control the data rate of the reverse traffic data channel 132. In other words, the operation phase 202 is performed more frequently than the initialization phase 200.

In the initialization phase 200, calibration of RRI values (representing data rates of the reverse link) and DRC values (representing data rates of the forward link) is performed (at 204) by the access network 40. Each RRI value represents the data rate of the reverse link between a given access terminal and the access network 40. Each DRC value represents the data rate of the forward link of the given access terminal and the access network 40.

In the calibration process (204), a noise threshold $L_t$ is set (at 204A) to a predefined value that represents a level of acceptable noise on the reverse link due to traffic activity. The predefined value of the noise threshold $L_t$ is set, based on empirical data, at a level that maximizes traffic while maintaining the noise level at an acceptable level.

Calibration is performed by setting (at 204B) RAB to the logical 0 state so that traffic data rates in the reverse links (from the access terminals in the cell sector to the access network) are increased (by the access terminals). The access network 40 measures (at 204C) the noise level of the reverse links until the threshold $L_t$ is reached. Measuring the noise level is performed by measuring the total power received by the transceiver in the access network 40. Accurate measurements usually require some amount of time (on the order of minutes).

Once the $L_t$ noise level is reached, the access network 40 records the relationship between the forward link data rates (DRC) and reverse link data rates (RRI). In response to the noise threshold $L_t$ being reached, the individual $DRC_i$ values of the access terminals $MS_i$ in a cell sector are summed (at 206) to produce a parameter DRC_tot(t):

$$DRC\_tot(t) = \sum_i \log_{10}(DRC_i(t)),$$

where $DRC_i(t)$ represents the DRC value of access terminal $MS_i$ at time t, and DRC_tot(t) represent the summed value of the logarithm of individual $DRC_1(t)$ values. Each $DRC_i$ value is a function of the propagation loss of the wireless link between the access network and the access terminal. The higher the propagation loss, the lower the data rate has to be set. Thus, $DRC_i$ represents a condition of the radio frequency (RF) link between the access network and the access terminal. DRC_tot thus represents the cumulative condition of the RF links between the access terminals served by the access network in the corresponding cell sector.

Next, the access network 40 computes (at 208) the reverse channel capacity. The reverse channel capacity is defined as the cumulative activity level of the reverse links between access terminals in the cell sector and the access network once the noise threshold $L_t$ has been reached. The reverse channel capacity is represented by $RRI\_tot_{th}$, which is a threshold value to represent the sum of the logarithm of all $RRI_1$ values of access terminals served by the access network. $RRI\_tot_{th}$ is calculated based on the value of DRC_tot (t) at the time when the noise on all reverse links has reached the threshold noise level $L_t$.

In one implementation, the relationship of DRC and RRI is expressed as:

$$\sum_i \log_{10}(RRI_i) = \sum_i \log_{10}(DRC_i) + \text{constant value},$$

where $RRI_1$ represents the RRI value for the reverse link between access terminal $MS_i$ and the access network 40, and $DRC_1$ represents the DRC value for the forward link between the access network 40 and the access terminal $MS_1$.

Several measurements are taken at different times during the initialization phase 200. Because of movement in the cell sector and possibly different numbers of active mobile stations, the DRC_tot(t) values measured at different times will be different, which means that the corresponding $RRI\_tot_{th}$ value will be different. The relationship between the DRC_tot(t) values and corresponding $RRI\_tot_{th}$ values are recorded (at 209). In one example, this relationship can be in the form of a lookup table.

The relationship between DRC_tot(t) and $RRI\_tot_{th}$ values is used during the operation phase to set the state of RAB in the forward MAC reverse activity channel 100 to control whether activity in the reverse traffic data channel 132 is to be increased or decreased.

Acts 204, 206, 208, and 209 are performed in the initialization or calibration phase 200. As noted above, the calibration phase is performed periodically or in response to defined events. On the other hand, the operation phase 202 is performed more frequently. In the operation phase, the access network 40 calculates the DRC_tot(t) value:

$$DRC\_tot(t) = \sum_i \log_{10}(DRC_i(t)).$$

From the calculated DRC_tot(t) value, the access network 40 accesses (at 211) the relationship (e.g., lookup table) to determine the corresponding $RRI\_tot_{th}$ value. Next, the access network 40 calculates (at 212) RRI_tot(t):

$$RRI\_tot(t) = \sum_i \log_{10}(RRI_i(t)),$$

where $RRI_i$ (t) represents the RRI value for access terminal $MS_i$ at time t (in other words, the data rate of the reverse link for access terminal $MS_i$ at a given time). RRI_tot(t) represents the sum of all $RRI_1$ values at time t. The calculated RR_tot(t) value is compared (at 214) against the threshold value $RRI\_tot_{th}$, (identified at 211). If RRI_tot(t) is greater than or equal to the threshold value $RRI\_tot_{th}$, then the RAB value is set (at 216) to logical 1. This indicates that there is too much activity in the reverse links and the access terminals are instructed to reduce their data rates.

On the other hand, if RRI_tot(t) is less than the threshold value $RRI\_tot_{th}$, the availability of physical resources at the access network 40 is checked (at 218). Physical resources refer to the hardware elements available in the access network 40. Availability of such hardware elements determine whether increased data activity can be supported. The state of a logical variable R is set (at 218) according to whether physical resources are available or not. If physical resources are available, then R is set to logical true; otherwise, R is set to logical false. Next, the access network determines (at 220) if R has the logical true or false state. If R has the logical true state, then that indicates that there are not enough physical resources and the state of RAB is set (at 216) to logical 1. On other hand, if R has the logical false, then the access network sets (at 222) the state of RAB to logical 0.

An access terminal performs rate control using the received state of RAB. The state of RAB affects a variable MaxRate in each access terminal, with MaxRate specifying a maximum data rate in the reverse traffic data channel 132 from the access terminal to the access network. MaxRate is based on the current transmission rate of the access terminal, the state of RAB, and a random number. Generally, if the access terminal receives RAB set to logical 0, then the value of MaxRate is increased or set at the same value based on the value of the generated random number. However, if the received RAB value has the logical state 1, then the value of MaxRate is either maintained at the same value or decreased based on the generated random number. Thus, effectively, RAB set to the logical value 0 allows an access terminal to increase its data rate on the reverse traffic channel if certain conditions are satisfied.

Effectively, in the procedure outlined in FIG. 3, a threshold reverse data rate (representing the cumulative reverse data rates of all access terminals in a cell sector) is set during the initialization phase 200. The threshold reverse data rate is computed from forward data rate values once activity in the reverse link has been measured to have reached a threshold level. The threshold reverse data rate represents an estimated capacity of the reverse link. This threshold reverse data rate is used to determine whether $RRI_1$ values (during operation of the access network 40) are too high or too low. Based on this determination, an indicator (RAB) is set by the access network 40 and communicated to all mobile stations in the cell sector to indicate whether activity (data rate) on the reverse links is to be increased or decreased.

The tasks performed by the access networks and access terminals are provided by software routines or modules in the access networks or access terminals. Instructions of such software routines or modules are stored on one or more storage devices in the corresponding systems and loaded for execution on corresponding control units or processors. The control units or processors include microprocessors, microcontrollers, processor modules or subsystems (including one or more microprocessors or microcontrollers), or other control or computing devices. As used here, a "controller" refers to hardware, software, or a combination thereof. A "controller" can refer to a single component or to plural components (whether software or hardware).

Data and instructions (of the software) are stored in respective storage devices, which are implemented as one or more machine-readable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; and optical media such as compact disks (CDs) or digital video disks (DVDs).

The instructions of the software are loaded or transported to each entity in one of many different ways. For example, code segments including instructions stored on floppy disks, CD or DVD media, a hard disk, or transported through a network interface card, modem, or other interface device are loaded into the entity and executed as corresponding software routines or modules. In the loading or transport process, data signals that are embodied in carrier waves (transmitted over telephone lines, network lines, wireless links, cables, and the like) communicate the code segments, including instructions, to the entity. Such carrier waves are in the form of electrical, optical, acoustical, electromagnetic, or other types of signals.

While the invention has been disclosed with respect to a limited number of embodiments, those skilled in the art will appreciate numerous modifications and variations there from. It is intended that the appended claims cover such modifications and variations as fall within the true spirit and scope of the invention.

What is claimed is:

1. A computer-readable medium containing instructions that when executed cause wireless access equipment in a cell segment to:
    measure activity on reverse links between mobile stations in the cell segment and the wireless access equipment;
    determine a threshold capacity of the reverse links in response to detecting the activity reaching a predefined threshold level; and
    subsequently, during operation of the wireless access equipment, using the threshold capacity to set one or more indications of whether to increase or decrease activity on the reverse links, wherein using the threshold capacity to set the one or more indications comprises:
    calculating a sum of data rates of the reverse link, wherein the data rates were communicated in reverse control channels from respective mobile stations to the wireless access equipment;
    comparing the sum to the threshold capacity;
    setting the one or more indications to increase activity in response to the sum being less than the threshold capacity; and
    setting the one or more indications to decrease activity in response to the sum being greater than the threshold capacity.

2. A method of controlling data rates in a wireless communications system, comprising:
    determining a condition of forward links between mobile stations and wireless access equipment, wherein determining the condition of forward links comprises determining based on data rates of the corresponding forward links, the data rates of the corresponding forward links provided in indicators from the mobile stations to the wireless access equipment;

computing a capacity of reverse links between the mobile stations and the wireless access equipment based on the condition of the forward links;

indicating to at least one of the mobile stations whether a data rate on the reverse link between the at least one mobile station and the wireless access equipment is to be increased or decreased, wherein the indicating is based on the computed capacity of the reverse links; and correlating the data rates of the forward links to data rates of the reverse links, wherein computing the capacity of the reverse links is based on the correlation of the data rates of the forward links and data rates of the reverse links.

3. The method of claim 2, wherein correlating the data rates comprises:

measuring noise of the reverse links while traffic on the reverse links is increased until a threshold noise level is reached; and computing the capacity of the reverse links based on a sum of data rates on the forward links at a time when the noise on the reverse links has reached the threshold noise level.

4. The method of claim 3, wherein the wireless communications system includes a code-division multiple access (CDMA) high rate packet data (HRPD) wireless system, the method further comprising: and calculating a sum of data rate control (DRC) values, the DRC values representing the data rates on the forward links.

5. The method of claim 4, wherein calculating the sum of DRC values comprises calculating the sum of a log of each DRC value.

6. The method of claim 2, wherein determining the condition of the forward links comprises determining the condition of CDMA HRPD forward links, and wherein computing the capacity of reverse links comprises computing the capacity of CDMA HRPD reverse links.

7. The method of claim 2, further comprising performing the determining and computing during a calibration phase and the indicating during an operation phase.

8. The method of claim 7, wherein the calibration phase is performed less frequently than the operation phase.

9. The method of claim 7, further comprising, during the operation phase:

calculating a sum of data rates of the reverse links indicated by mobile stations; and comparing the calculated sum to the computed capacity of reverse links.

10. The method of claim 9, wherein indicating whether the data rate on the reverse link is to be increased or decreased comprises communicating an indicator to the at least one mobile station, the indicator having one of two states.

11. The method of claim 9, wherein the wireless communications system includes a CDMA HRPD wireless system, wherein calculating the sum of data rates of the reverse links comprises calculating the sum of reverse rate indicator (RRI) values.

12. The method of claim 2, wherein determining the condition of forward links between mobile stations and wireless access equipment comprises determining the condition of forward links defined by one of a 1xEV-DO protocol, 1xEV-DV protocol, UMTS protocol, and multi-carrier data-voice protocol.

13. A system comprising:

an interface adapted to communicate over wireless forward links and wireless reverse links with mobile stations; and a controller adapted to compute a capacity of the reverse links based on forward link data rate information received in indicators from the mobile stations, to monitor a level of usage of the reverse links, and to communicate one or more reverse activity indicators to the mobile stations to indicate whether data rates on the reverse links are to be increased or decreased based on a comparison of the usage of the reverse links and the computed capacity, wherein the controller is adapted to communicate the one or more reverse activity indicators by communicating a reverse activity bit to the mobile stations, the reverse activity bit defined by a code-division multiple access (CDMA) high rate packet data (HRPD) protocol, the reverse activity bit set to a first state to indicate that activity on the reverse links is to be increased, and set to a second state to indicate that activity on the reverse links is to be decreased.

14. The system of claim 13, wherein the controller is adapted to compute the capacity of the reverse links by computing a sum of data rates of forward links between the mobile stations and the system.

15. The system of claim 13, wherein the forward link data rate information comprises data rates of respective forward links communicated from corresponding mobile stations to the system.

16. A computer-readable medium containing instructions that when executed cause wireless access equipment in a cell segment to:

measure activity on reverse links between mobile stations in the cell segment and the wireless access equipment;

determine a threshold capacity of the reverse link in response to detecting the activity reaching a predefined threshold level; and subsequently, during operation of the wireless access equipment, using the threshold capacity to set one or more indications of whether to increase or decrease activity on the reverse links, wherein using the threshold capacity to set the one or more indications comprises determining usage of the reverse links and comparing the usage against the threshold capacity to set the one or more indications.

17. The computer-readable medium of claim 16, wherein the instructions when executed cause the wireless access equipment to communicate the one or more indications to the mobile stations.

18. The computer-readable medium of claim 17, wherein the instructions when executed cause the wireless access equipment to communicate the one or more indications by communicating a reverse activity bit to the mobile stations, the reverse activity bit defined by a code-division multiple access (CDMA) high rate packet data (HRPD) protocol.

19. The computer-readable medium of claim 18, wherein the instructions when executed cause the wireless access equipment to set the reverse activity bit to a first state to indicate that activity on the reverse links is to be increased, and to set the reverse activity bit to a second state to indicate that activity on the reverse links is to be decreased.

20. The computer-readable medium of claim 16, wherein the instructions when executed cause the wireless access equipment to communicate the one or more indications to the mobile stations, the one or more indications defined by one of a 1EV-DO protocol, 1xEV-DV protocol, UNITS protocol, and multi-carrier data-voice protocol.

21. The computer-readable medium of claim 16, wherein the instructions when executed cause the wireless access equipment to perform the measuring and determining during a calibration phase.

22. The computer-readable medium of claim 21, wherein the instructions when executed cause the wireless access equipment to perform the operation substantially continuously but perform the calibration phase less frequently.

23. The computer-readable medium of claim 16, wherein the instructions when executed cause the wireless access equipment to measure activity by measuring an amount of noise received by the wireless access equipment.

24. The computer-readable medium of claim 23, wherein the instructions when executed cause the wireless access equipment to determine the threshold capacity by determining a sum of the data rates on the reverse links at the time that the noise has reached the predefined threshold level.

25. The computer-readable medium of claim 24, wherein the instructions when executed cause the wireless access equipment to receive an indicator of data rate of each reverse link from a corresponding mobile station.

26. The computer-readable medium of claim 24, wherein the instructions when executed cause the wireless access equipment to compute a sum of data rates of forward links between the mobile stations and the wireless access equipment, wherein determining the sum of the data rates on the reverse links is based on the computed sum of data rates of the forward links.

27. A computer-readable medium containing instructions that when executed cause wireless access equipment in a cell segment to:
  measure activity on reverse links between mobile stations in the cell segment and the wireless access equipment;
  determine a threshold capacity of the reverse links in response to detecting the activity reaching a predefined threshold level; and
  subsequently, during operation of the wireless access equipment, using the threshold capacity to set one or more indications of whether to increase or decrease activity on the reverse links,
  wherein determining the threshold capacity of the reverse links is calculated from data rates of forward traffic channels, the data rates of forward traffic channels provided in control channels from the mobile stations to the wireless access equipment.

* * * * *